United States Patent
Henn et al.

(10) Patent No.: US 8,573,194 B2
(45) Date of Patent: Nov. 5, 2013

(54) ARRANGEMENT FOR REFLECTION OF HEAT RADIATION, PROCESS OF MAKING SAME AND USES OF SAME

(75) Inventors: Christian Henn, Frei-Laubersheim (DE); Wolfgang Schmidbauer, Mainz (DE); Torsten Gabelmann, Wiesbaden (DE)

(73) Assignee: Schott AG, Mainz (DE)

( * ) Notice: Subject to any disclaimer, the term of this patent is extended or adjusted under 35 U.S.C. 154(b) by 761 days.

(21) Appl. No.: 12/493,363

(22) Filed: Jun. 29, 2009

(65) Prior Publication Data
US 2009/0320824 A1 Dec. 31, 2009

(30) Foreign Application Priority Data

Jun. 30, 2008 (DE) .......................... 10 2008 030 825

(51) Int. Cl.
*F24B 1/18* (2006.01)

(52) U.S. Cl.
USPC ............ 126/500; 126/907; 126/908; 359/589

(58) Field of Classification Search
USPC .............. 126/500, 273 R, 907, 908; 359/359, 359/589; 204/192.15; 428/336
See application file for complete search history.

(56) References Cited

U.S. PATENT DOCUMENTS

| | | | | |
|---|---|---|---|---|
| 4,265,974 A * | 5/1981 | Gordon | .......................... | 428/432 |
| 4,401,693 A * | 8/1983 | Frank et al. | .................... | 427/160 |
| 4,985,312 A * | 1/1991 | Furuya et al. | ................. | 428/627 |
| 5,073,451 A * | 12/1991 | Iida et al. | ....................... | 428/336 |
| 5,834,103 A | 11/1998 | Bond et al. | | |
| 6,073,625 A * | 6/2000 | Ball | .............................. | 126/547 |
| 6,114,043 A | 9/2000 | Joret | | |
| 6,220,239 B1 * | 4/2001 | Kieslinger et al. | ............ | 126/340 |
| 6,638,645 B2 * | 10/2003 | Sawai et al. | .................... | 428/690 |
| 7,034,326 B2 * | 4/2006 | Noguchi et al. | ............... | 250/573 |
| 2003/0155790 A1 * | 8/2003 | Noguchi et al. | ............. | 296/84.1 |
| 2003/0157339 A1 | 8/2003 | Sawada et al. | | |
| 2003/0232181 A1 * | 12/2003 | Simpson et al. | .............. | 428/212 |
| 2004/0064205 A1 | 4/2004 | Kloper et al. | | |
| 2004/0229465 A1 | 11/2004 | Kiyota et al. | | |
| 2005/0030629 A1 | 2/2005 | Kursawe et al. | | |
| 2007/0273973 A1 | 11/2007 | Kursawe et al. | | |
| 2007/0275252 A1 | 11/2007 | Krasnov | | |
| 2008/0107893 A1 * | 5/2008 | Korotkov et al. | ............. | 428/336 |

FOREIGN PATENT DOCUMENTS

| | | |
|---|---|---|
| CN | 1525946 | 9/2004 |
| DE | 695 03 896 | 12/1998 |
| DE | 698 13 648 | 2/2004 |
| DE | 103 36 041 | 2/2005 |
| DE | 10 2004 053 706 | 5/2006 |
| DE | 10 2005 032 786 | 1/2007 |
| DE | 10 2007 007 755 | 8/2008 |
| EP | 0 905 273 | 3/1999 |
| GB | 2 335 201 | 9/1999 |
| WO | 03/093185 | 11/2003 |
| WO | 2006/091668 | 8/2006 |
| WO | 2007/018951 | 2/2007 |

OTHER PUBLICATIONS

DIN 13240: Room Heaters Fired by Solid Fuel—Requirements and Test Methods; German Version EN 13240:2001 + A2:2004. Oct. 2005. ICS 97.100.30. German Standard. Standards Committee for Heating, Cooking and Warming Devices (FNH) in the German Standards Institute (DIN), (with a partial Eng. transl.).

\* cited by examiner

*Primary Examiner* — Avinash Savani (74) *Attorney, Agent, or Firm* — Michael J. Striker (57) ABSTRACT

The heat reflecting arrangement with an improved high heat resistance, e.g. 100 hours at 500° C., includes a substrate, a heat reflecting layer (A) on at least one side of the substrate, which contains indium tin oxide (ITO), and a barrier layer (B) that covers the heat reflecting layer (A), which contains a metal oxide and/or a metal nitride. A fireplace or baking oven with a viewing window having this layer system with the heat reflecting layer is also described. In addition a process for providing the heat reflecting arrangement is described.

20 Claims, 5 Drawing Sheets

ARRANGEMENT FOR REFLECTION OF HEAT RADIATION, PROCESS OF MAKING SAME AND USES OF SAME

CROSS-REFERENCE

The invention disclosed and claimed herein below is also described in German Patent Application DE 10 2008 030 825.0, filed on Jun. 30, 2008, in Germany, whose subject matter is incorporated herein by explicit reference thereto. The aforesaid German Patent Application provides the basis for a claim of priority of invention for the invention claimed herein below under 35 U.S.C 119(a) to (d).

BACKGROUND OF THE INVENTION

1. The Field of the Invention

The present invention relates to an arrangement for reflecting heat radiation, which comprises an especially transparent substrate such as a glass or glass ceramic substrate, which has a heat reflecting metal oxide layer and, if necessary, other metal oxide layers on at least one side of the substrate. It also relates to a process for making the arrangement and to its uses.

2. The Related Art

Many materials, and indeed both opaque and transparent substrates, e.g. glass, may be provided with new properties by applying layers to their surfaces. Thus e.g. coatings are known, which are transparent for visible light, but only have limited transparency for radiation in the infrared range and the UV range of the spectrum. These types of articles or arrangements are used in glass for building purposes, in industrial plants, fireplaces, baking ovens or even vehicle windows.

For example, wood-fired fireplaces for private use are currently equipped with ROBAX® viewing window panes (from SCHOTT AG, Germany). These fireplaces currently have a comparatively high heating capacity so that a considerable fraction of the heat produced is delivered through the viewing window pane. This is desired when the fireplace is put into operation, since much heat should be delivered to the room at the start of the heating, so that it is heated as rapidly as possible.

On the other hand, considerable heat should be produced so that the fire reaches a controlled combustion state as quickly as possible, i.e. the fuel must burn at as high a temperature as possible. If the fireplace has reached the desired combustion capacity, however a large fraction of the heat is delivered through the fireplace viewing window pane and it significantly heats its surroundings, even the floor and objects in the vicinity of the fireplace. If a wood floor or other valuable furnishings are found near the fireplace window pane, more or less strong aging processes can occur depending on the type of wood.

Usually the fireplace viewing window pane is at temperatures of definitely more than 250° C. in operation. The fireplace viewing window pane is thus a source of danger for children at play.

Soot and fine dust, nitrogen oxides, carbon monoxide and/or carbon dioxide are produced during the combustion according to the combustion conditions. These products are produced both at the start of the combustion and even when it reaches its nominal or rated heating power.

Moreover the modern fireplace frequently is connected with a central heating system, into which the exhaust gas from the fireplace is conducted so that its excess heat can be used once again. Thus excess heat energy, which would otherwise remain in the fireplace and/or in the surroundings, can be additionally useful.

A glass article, which comprises a transparent heat-resistant flat glass, which is provided with a more or less opaque window, is described in US Published Patent Application 2005/0064205 A1. The average transmission of visible light through this window at wavelengths between 380 and 370 nm is 0.03 to 14% and the average reflectivity is at least 50% in the infrared range at wavelengths of from 1000 to 2500 nm.

A coated glass is described in WO 03/093185, which is especially suitable for photovoltaic cells. This glass has a conductive layer acting as an electrode, which comprises an indium oxide layer doped at least with one or more elements. This layer itself can be coated by a protective layer comprising fine metal or metal nitride. Also the use of this sort of electrode as a heating insulating layer is mentioned in that WO reference.

SUMMARY OF THE INVENTION

It is an object of the present invention to provide an arrangement for reflecting heat radiation, which permits as much radiation as possible in the infrared region of the spectrum to be reflected, but is completely transparent in the visible region of the spectrum.

It is also an object of the present invention to provide an arrangement that remains heat resistance at high application temperatures, especially application temperatures up to 500° C.

It is a further object of the present invention to provide an arrangement for reflecting heat that reduces the temperature in front of the fireplace viewing window pane, so that objects in front of the fireplace experience no aging due to the action of the heat from the fireplace. Especially an arrangement for reflecting heat should be provided, which provides that the heat remains in the fireplace so even during operation of the fireplace it can be touched from the outside at least for a short time without seriously burning.

It is an additional object of the present invention to provide an arrangement for reflecting heat that allows the combustion in the fireplace to reach a combustion state with higher combustion temperatures in a shorter time and also to increase the temperatures during the entire combustion. In this way both the formation of soot and fine dust and the formation of nitrogen oxides are reduced. Furthermore in this way additional heat, which can be delivered by exhaust gases and used again, is retained.

These objects and others, which will be made more apparent herein after, are attained by the arrangement with the features defined in the appended claims.

According to the invention it was found that a thin metal oxide layer, which contains indium tin oxide (ITO), reflects infrared radiation especially well. This layer is characterized in the following as layer A. The heat reflecting layer of course contains other components besides the indium tin oxide, which are known according to the state of the art. However preferably it has at least 30 wt. %, more preferably at least 50 wt. %, and especially preferably at least 70 wt. % of the indium tin oxide. However it is most preferred when the heat reflecting layer contains at least 80 wt. % of the indium tin oxide. In a typical embodiment it is substantially completely indium tin oxide, apart from necessarily present impurities.

The arrangement for reflecting heat according to the invention thus comprises a base substrate, which is preferably flat or planar, which has a heat-reflecting layer on at least one side, which comprises or contains the indium tin oxide (ITO).

A barrier layer is arranged over or on the heat-reflecting layer, which covers the ITO layer. The barrier layer especially contains at least one metal oxide and/or at least one metal nitride. Because of that a layer sequence results, which is the following: substrate/ITO layer (A)/barrier layer (B).

The barrier layer (B) provides further improvements in the heat resistance. Especially the barrier layer (B) permits the operation of the fireplace at a temperature between 450° C. and 550° C., preferably at a temperature of 500° C. for more than 80, especially more than 100 hours. However an operating time of more than 130 hours is particularly preferred.

Preferred oxides and/or nitrides include silicon dioxide ($SiO_2$), silicon nitride ($Si_3N_4$), aluminum oxide ($Al_2O_3$), $TiO_2$, $SiO_xN_y$ with x=0 to 2 and y=0 to 4/3, $ZrO_2$, $MoO_2$ and $Nb_2O_5$.

The silicon nitride can also have a composition varying from the above-described stoichiometry and other elements can be contained like e.g. oxygen as oxides. The silicon nitride however preferably contains less than 5 atom % of oxygen, especially preferably less than 2 atom % of oxygen. It is most preferred when no oxygen is contained in the silicon nitride.

The barrier layer (B) preferably has a thickness in a range of at least 50 nm, usually at least 100 nm. A preferred maximum thickness amounts to 400 nm. It is especially preferred when the barrier layer (B) has a thickness in the vicinity of 300 nm up to 400 nm. The barrier layer is preferably composed of silicon dioxide.

The barrier layer according to the invention has a high barrier or blocking property as measured by an AAS (atomic absorption spectroscopy) test.

In addition, the layer is leached at 98° C. over a time interval of 1 hour by means of 0.1 m HCl and the residual amount of $Na_2O$ is measured. The measured residual amount in the layers according to the invention is below 1 µg/dm$^2$, which for example is detected by atomic absorption spectroscopy (AAS).

The ITO layer (A) and the barrier layer (B) cooperate as reflector and interference system. The plasma edge can be further shifted to lower wavelengths by this interference system. The plasma edge in this case is preferably in a range between 1200 nm and 1300 nm. The thickness of the barrier layer (B) is selected according to the refractive index of the barrier layer. A shift of the plasma edge to lower wavelength is achieved by this sort of interference optic effect. Of course a reflectivity of 70% at about 200 nm, preferably about 300 nm is preferred. A reflectivity of 70% is especially preferred at about at least 400 nm.

Understandably additional heat reflecting coatings can be provided above and below the ITO layer besides the heat reflecting coating or layer system according to the invention. The layer system is arranged on that side of the substrate, which is facing the heat source and on which the IR or heat radiation to be reflected impinges. Understandably the layer system can also be present on the side facing away from the heat source. In an especially suitable embodiment the layer system according to the invention is provided on both sides of the substrate.

Preferably transparent materials, such as glass, glass ceramic and/or other ceramics, are used as the flat substrate or carrier for the layer system. However principally other opaque or transparent materials, such as metals, wood or plastic materials can be used with the heat reflecting layer system according to the invention, in order to protect the underlying substrate from excessively intense or strong heating.

The heat reflecting indium tin oxide (ITO) layer preferably has a thickness of at least 100 nm in the arrangement according to the invention. The preferred minimum thickness amounts to 300 or 450 nm. The preferred maximum thickness amounts to 700 nm or 800 nm. However embodiments with a maximum thickness of 600 nm are especially preferred.

In a further preferred embodiment the electron density, i.e. the number of electrons per unit volume, of the heat reflecting ITO layer is from $1.0 \times 10^{21}$ to $1.7 \times 10^{21}$ electrons cm$^{-3}$, preferably $1.2 \times 10^{21}$ electrons cm$^{-3}$.

Indium tin oxide (ITO) is transparent and a semiconductor. Preferably the indium tin oxide has a tin content of from 5 to 20% or from 7 to 13%, in relation to the total amount of tin and indium present in the ITO material. A tin content of from 8 to 12% and especially a tin content of from 9 to 11%, in relation to the total amount of tin and indium in the ITO material are most preferred. A frequently used tin content amounts to about 10% of the total amount of tin and indium present.

The ITO layer is transparent and conductive. However one should not overlook the fact that the transparency and conductivity properties change in the opposite direction to each other with changing electron density. The conductivity increases with the electron density, while the optical transparency in the visible region of the spectrum decreases with increasing transparency. Thus the electron density according to the present invention should never be so high that the arrangement for reflecting infrared radiation looses its optical transparency.

The electrons in the ITO layer preferably have a mobility of at least 25 cm$^2$/Vs, especially at least 40 cm$^2$/Vs, but an electron mobility of at least 42 cm$^2$/Vs, is particularly preferred. A preferred maximum mobility amounts to 50 cm$^2$/Vs, especially 48 cm$^2$/Vs. Electron mobility values in typical embodiments amount to about 45±1 cm$^2$/Vs at a temperature of 20° C.

The plasma edge is a characteristic feature of a reflectance spectrum. It is that position in the spectrum of a solid body at which the so-called plasma resonance occurs. The plasma edge effectively divides the reflectance spectrum of the body into two regions, namely one long wave region in which the radiation is reflected from the body and a short wave region in which the short wave radiation passes through the body.

Advantageously the ITO layer has a plasma edge between 1200 and 1800 nm, preferably between 1200 nm and 1600 nm. Since a glass ceramic does not reflect at wavelengths less than 4.5 µm, the flame spectrum has its maximum at about 3.5 µm and the incandescent spectrum has a maximum even at 2.5 µm, a very steep plasma edge shifted to lower wavelengths is required, in order to obtain the most efficient possible heat reflection.

The electromagnetic waves in a spectral range between visible light and long wave microwave radiation are called infrared radiation. This region of the spectrum corresponds to wavelengths between about 780 nm to 1 mm, but for the present invention a region of the spectrum between 350 nm and 5 µm is especially relevant.

Visible light has wavelengths in a spectral range between 380 nm and 780 nm.

The degree of reflection (reflectivity) is defined as the ratio of the reflected intensity to the incident intensity. For example, the reflectivity for visible light is the ratio of the reflective light intensity to the incident light intensity.

The transmittance or degree of transmission of an object is defined as the ratio of the light intensity of the incident light falling on the object to the light intensity of the light after passing through the object.

The index of refraction changes with wavelength. For the purposes of the present invention the expression "refractive index" means the refractive index of light at a wavelength of 550 nm. An imaginary component of the refractive index is negligible in evaluating and stating the refractive index for the purposes of the present invention.

The arrangement for reflection of heat radiation and/or the layer system preferably has a reflectivity in the infrared range (i.e. at 5 µm) of at least 0.7, especially at least 0.8, and most preferably of at least 0.9. These values are still maintained even after a thermal load of 500° C. for at least 100 hours. The IR reflectivity, which depends on wavelength and in a preferred embodiment on interference effects, is usually at least 50% in a range of from 1.6 to 1.45 µm, usually at least 60% in a range of from 1.8 to 1.5 µm, and usually at least 70% in a range of from 2.05 to 1.63 µm.

The layer system according to the invention also has a color change of dE<4 in the LAB color system, even after a thermal load of 500° C. for at least 100 hours.

These reflectivity values are easily determined by means of a conventional spectrophotometer.

The heat reflecting layer (A) preferably has a transmittance of at least 70%, especially at least 80% and most especially at least 85% in the visible range. Advantaaeouslv the combination of the heat reflecting layer (A) and the barrier layer (B) also have these preferred transmittance values.

The ITO layer (A) preferably has a surface resistance<10 $\Omega/\square$, especially <7 $\Omega/\square$ and most especially <4 $\Omega/\square$ (wherein "$\square$" means "square"). Preferably the refractive index of the ITO layer (A) is in a range between 1.8 and 2.

The substrate of the arrangement for reflecting heat radiation is preferably glass or glass ceramic. Suitable glass for the substrate includes alkali-containing float glass, especially borosilicate glass, (e.g. BOROFLOAT® glass, such as BOROFLOAT® 33 or BOROFLOAT® 44, or DURAN® of SCHOTT AG, Mainz), particularly alkali-free glass (e.g. AF37, AF45 of SCHOTT AG, Mainz); alumino-silicate glass (e.g. FIOLAX®, ILLAX, of SCHOTT AG, Mainz); alkaline earth glass (e.g. B270 and BK7 of SCHOTT AG, Mainz); $Li_2O$—$Al_2O_3$—$SiO_2$ float glass, decolorized or bleached float glass and soda lime glass.

Typical glass ceramics, which can be used as the substrate in the arrangement according to the invention, include alkali containing glass ceramics, e.g. lithium-alumo-silicates (LAS glass ceramics, such as CERAN®, ROBAX® or ZERO-DUR®, all trademarked products of SCHOTT AG, Mainz), and also alkali free glass ceramics, such as magnesium-alumo-silicates (MAS). Lithium-aluminum-silicate glass ceramics, like those described in DE 10 2005 032 786 A1, can be used as the glass ceramic substrate in the arrangement according to the invention.

The arrangement according to the invention is not only not limited in regard to materials, especially for the substrate, but also not limited in regard to shape or form, so that for example flat, round, rounded, large and small forms can be used. Flat forms are preferred The glass and/or glass ceramic substrate according to the invention is preferably in the form of a window pane, e.g. for a fireplace or oven.

Thus the invention also concerns an arrangement for reflection of heat radiation, which has a heat-reflecting, ITO-containing layer (A) with a thickness in a range of from 580 nm to 630 nm, preferably with a thickness of 600±5 nm, and a barrier layer (B), preferably comprising $SiO_2$, with a thickness in a range of from 340 to 360 nm, preferably of 355±4 nm.

A transparent arrangement for reflection of heat radiation, which has a layer system comprising an ITO layer (A) and a barrier layer (B), preferably has a transmittance in the visible range of the spectrum >85%, especially >90% in relation to the arrangement itself.

The barrier layer (B) preferably has an index of refraction in a range of from 1.3 to 1.8, advantageously from 1.4 to 1.7. This layer system has no interference colors by a suitable selection of the indices of refraction for the ITO layer (A) and the barrier layer (B). Preferably the arrangement containing the above-described layer system shows a color change in the LAB color system of at most dE=10, especially at most dE=8, and most preferably at most dE=4 even after thermal loads up to 500° C.

In a further preferred embodiment the barrier layer (B) comprising a plurality of individual sub-layers, especially from 3 to 5 sub-layers, which are observable by means of SEM pictures taken through interfaces.

The barrier layer (B) protects the ITO layer (A) and/or the transparent substrate from a tendency to tear or crack in an especially preferred embodiment. Preferably the thickness of the barrier layer (B) amounts to from 300 nm to 400 nm.

The barrier layer (B) additional acts as a protective layer for the ITO layer (A) that protects it against chemical corrosion, as a mechanical protective layer, such as a scratch resistant layer, as a layer with optical functions and as a layer, which can improve the adherence of the optional layers covering it. The composition of this sort of layer can be taken from the disclosures in DE 10 2005 032 786 A1, e.g. zinc- and magnesium-containing LAS ceramics.

The barrier layer (B) itself can be coated or overlaid with an easily cleanable surface. In a further embodiment this additional layer (D) has a very hard surface. If the barrier layer (B) is provided on the inner side of a baking oven viewing glass pane, usually it is temperature-resistant at 300° C. for 100 hours, easy to clean various contaminants (for example cheese, ketchup, curd, pork bellies, plum butter) at high temperatures (up to 300° C.), has good mechanical strength in a radius test, scrubbing test with the usual cleaning cloths or sponges, e.g. with a microfiber cloth, and is chemically resistant to diverse cleaning agents, for example baking oven cleaners, washing agents, vinegar cleaners, and food.

The present invention also concerns an article or arrangement in which a separating layer (C), which comprises at least one metal oxide and/or metal nitride, is arranged between the substrate and the ITO layer (A). The separating layer (C) similarly preferably comprises silicon dioxide ($SiO_2$), silicon nitride ($Si_3N_4$) and/or aluminum oxide ($Al_2O_3$). $TiO_2$, $SiO_xN_y$, with x=0 to 2 and y=0 to 4/3, $ZrO_2$, $MoO_2$ and $Nb_2O_5$ are additional suitable materials.

The position of the plasma edge, as described earlier, is not changed by the separating layer (C). The separating layer (C) reduces the diffusion of alkali ions from the substrate into the heat-reflecting layer (A) and prevents deterioration of the conductivity. Moreover the separating layer (C) prevents diffusion of indium into the boundary surface between the substrate and the heat reflecting layer (A).

Preferably the separating layer (C) has a thickness in a range of from 50 nm to 200 nm, especially in a range from 80 nm to 120 nm. A thickness of 100 nm is most preferred.

Preferably the separating layer (C) comprises silicon dioxide.

In an advantageous embodiment the arrangement for reflecting heat according to the invention has a separating layer (C) with a thickness of 80 to 120 nm, preferably of 100±10 nm, especially ±5 nm; an ITO layer (A) with a thickness of 580 nm to 630 nm, preferably of 600±10 nm; and a barrier layer (B) with a thickness of 340 nm to 360 nm, preferably 355±5 or ±2 nm.

This layer system likewise acts as an interference system, which allows a further increase of the temperatures within the fireplace or baking oven and at the same time leads to a reduction of the temperatures in front of the fireplace.

Preferably the arrangement for reflection of heat according to the invention with the layer system comprising the separating layer (C)/ITO layer (A)/barrier layer (B) has a transmittance greater than 85%, especially greater than 90%, in the visible range of the spectrum.

The laser system according to the invention comprising the barrier layer (B), the ITO layer (A) and the separating layer (C) can be provided on both the outer side and the interior side of the fireplace viewing window pane or the baking oven viewing window pane. In so far as the layer system is found on the outer side, the layer sequence from the outside to the inside is barrier layer (B)/ITO layer (A)/separating layer (C). This layer system permits the eventual easy removal of soot from the fireplace window pane.

In so far as the layer system is provided on the inner side of the fireplace, it has the following layer sequence in a direction from the interior of the fireplace to the outside: barrier layer (B)/ITO layer (A)/separating layer (C)/substrate. This layer system facilitates the eventual removal of soot on the fireplace viewing window.

A further embodiment of the transparent arrangement for reflection of heat according to the invention has a layer sequence, which is barrier layer (B)/ITO layer (A)/separating layer (C)/substrate/separating layer (C)/ITO layer (A)/barrier layer (B). Temperatures on the outer side of the substrate, which clearly make touching the viewing window pane safe, are reached in this embodiment, which has the coating on both sides of the substrate.

The ITO layer is preferably applied by means of a sputtering process (cathode sputtering).

A sputtering process is preferred, which is selected from the group consisting of DC magnetron sputtering, RF sputtering, HF sputtering, DC diode sputtering, DC triode sputtering and reactive MF sputtering, wherein DE magnetron sputtering and reactive MF sputtering are especially preferred.

Sputtering is a physical process, in which atoms from a solid body (target) are released by bombardment with energetic ions (predominantly rare gas ions) and are conducted into the gas phase. Material from the bombarded target is deposited during sputtering with a predetermined target power density.

According to the present invention a target power density in a range preferably of from 4 to 8 W/cm$^2$, especially of from 4 to 6 or 5 W/cm$^2$, is used according to the invention for application of the layer (A) containing the heat reflecting indium tin oxide.

A sintered body of a composite metal oxide chiefly comprising an oxide of indium (In) and an oxide of tin (Sn) can be used as the target for the sputtering. The target used for the process usually has a sintered density of at least 80%, preferably of at least 90%, but at least 95% sintered density is especially preferred. Furthermore the target can contain, instead of part of the oxide of tin, a small amount, for example a fraction of 10%, or the entire amount of at least one metal selected from the group consisting of titanium (Ti), copper (Cu), zinc (Zn), germanium (Ge), antimony (Sb), gallium (Ga), cerium (Ce), tungsten (W), rhenium (Re), lead (Pb) and other metals as oxides.

A barrier layer (B) can be applied on the ITO layer (A) with a process selected from the group consisting of sputtering processes, vacuum vaporization processes, such as CVD (chemical vapor deposition) and PVD (physical vapor deposition), electron beam vaporization, ion plating processes and flame pyrolysis, immersion coating and spray pyrolysis. The same processes are suitable for application of the separating layer (C) on the transparent substrate. Processes for application or deposition of silicon nitride are disclosed, e.g. in DE 698 13 648 and DE 695 03 896.

A layer comprising silicon dioxide may be applied also by means of a sol-gel process, such as described in DE 103 36 041.

Similarly a separating layer (C) may be applied to the substrate by flame pyrolysis techniques, as described in DE 10 2004 053 706.

A barrier layer (B) is applied to the ITO layer (A) by means of a sputtering process. Especially target power densities in a range of from 10 to 20 W/cm$^2$, preferably from 12 to 17 W/cm$^2$, and especially of 15±1 W/cm$^2$, are used.

The separating layer (C) is preferably applied to the substrate by means of a sputtering process. Preferably target power densities in a range of from 10 to 20 W/cm$^2$, preferably from 12 to 17 W/cm$^2$, and especially of 15±1 W/cm$^2$, are used in this case also.

In an additional embodiment of the present invention an article comprising a substrate with an ITO layer (A) and a barrier layer (B) is tempered after application of the barrier layer (B).

In this connection "tempering" means a heat treatment at a temperature between 300° C. and 700° C., preferably between 350° C. and 500° C. The tempering duration amounts to from 1 hour to up to 100 hours, preferably at least 2 hours, especially at least 3 hours.

The tempering process permits elimination of faults in the ITO layer (A). In this way the conductivity of the ITO layer can be improved. The tempering process is preferably performed in the presence of the barrier layer (B).

The invention also concerns the use of the aforesaid arrangement for thermal screening of hot objects. One type of application concerns for example the observation of hot processes in industrial plants, such as the melting of glass, of metals, in oven processes or also combustion in heating systems. Preferably the arrangement for reflection of heat is used in a fireplace, especially as a transparent viewing window pane, through which the combustion process in the fireplace can be observed. However it is also possible in principle to use the arrangement according to the invention for lining a combustion chamber of a fireplace.

The arrangement according to the invention can increase the combustion temperature in the fireplace. This increase provides an increase of the temperatures within the inner space in the fireplace in a short time, so that reduced amounts of nitrogen oxides and soot and other fine dust are produced during the combustion. The soot is also burned so that more heat is produced.

The aforesaid transparent article according to the present invention is likewise suitable for use in baking ovens. Preferably the aforesaid transparent article is used as a viewing window pane in a baking oven or for lining the interior space or chamber of the baking oven.

BRIEF DESCRIPTION OF THE DRAWING

The objects, features and advantages of the invention, will now be illustrated in more detail with the aid of the following description of the preferred embodiments, with reference to the accompanying figures in which.

DESCRIPTION OF THE PREFERRED EMBODIMENTS

Production Example

Figure 3:
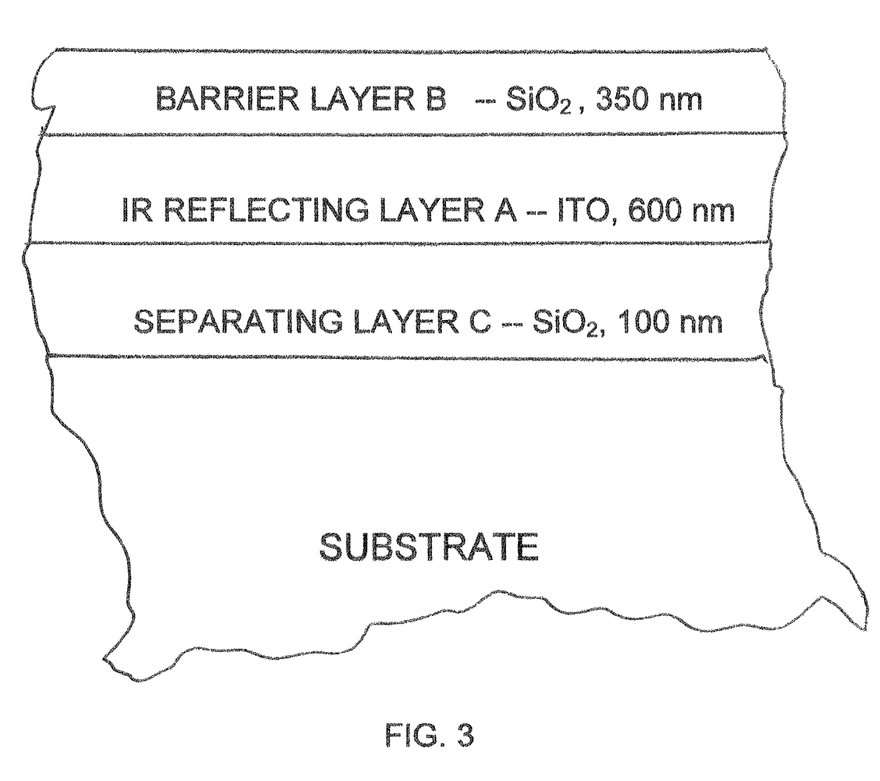
FIG. 3 is a diagrammatic cross-sectional view showing one embodiment of the arrangement for reflection of heat radiation according to the invention, which is embodied as a fireplace viewing window pane.

An IR-reflecting layer system was made by sputtering with a high sputtering power. The layer system, which is shown in FIG. 3, comprised the following sequence of layers with respective thicknesses: barrier layer B, $SiO_2$, 355 nm; IR reflecting layer A, ITO, 600 nm; and separating layer C, $SiO_2$, 100 nm. The $SiO_2$ layers were each sputtered with a sputtering power of 15 $W/cm^2$ to obtain good barrier action (AAS: ≤1 $\mu g/cm^2$). The ITO layer was made with a sputtering power of 4.3 $W/cm^2$ to obtain a TCO coating that was as heat resistant as possible. During production ITO was typically loaded not higher than with 3 $W/cm^2$. The following temperature behavior measurements were made on the resulting layer system provided on one or both sides of a substrate.

Measurement Results

A) Temperatures of Fireplace Viewing Window Panes

Figure 4:
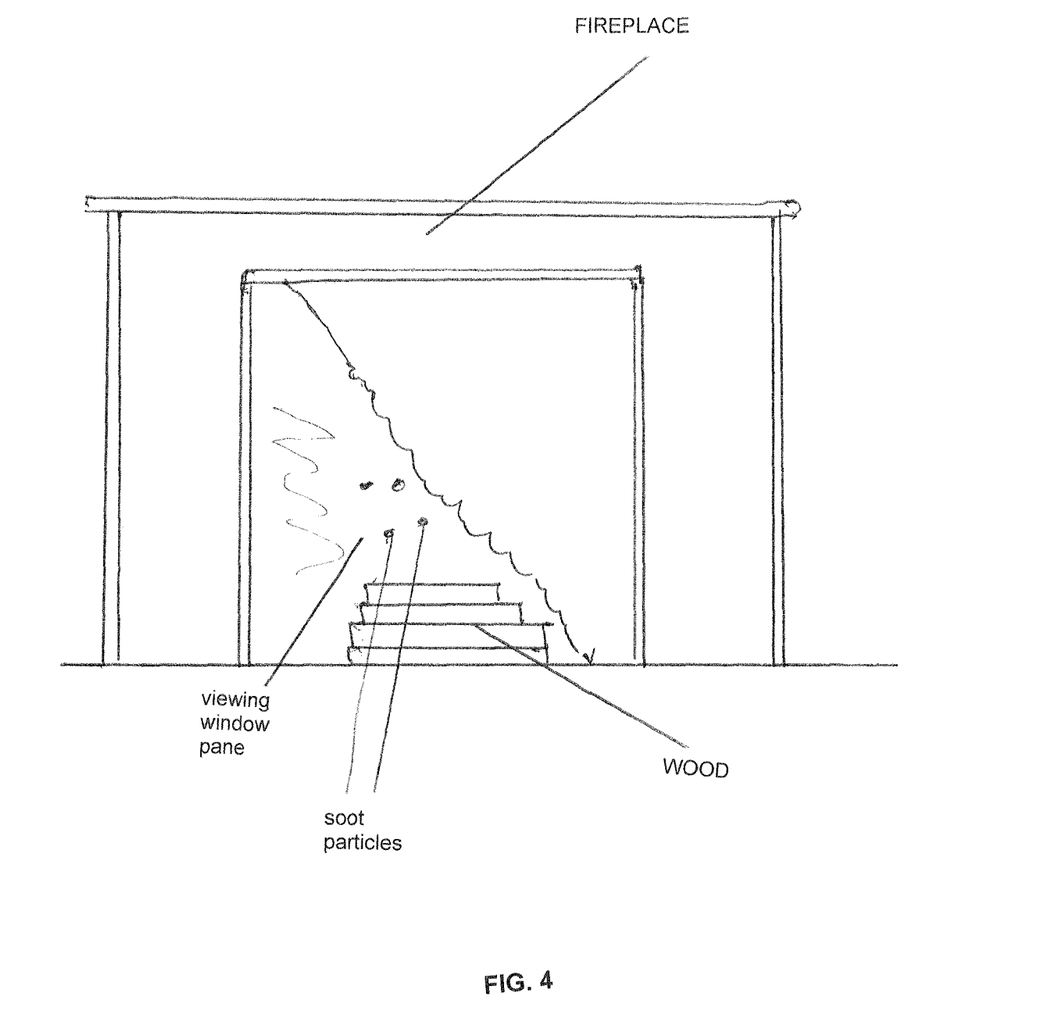
FIG. 4 is a front plan view of a fireplace having a viewing window pane of the present invention.
Figure 5:
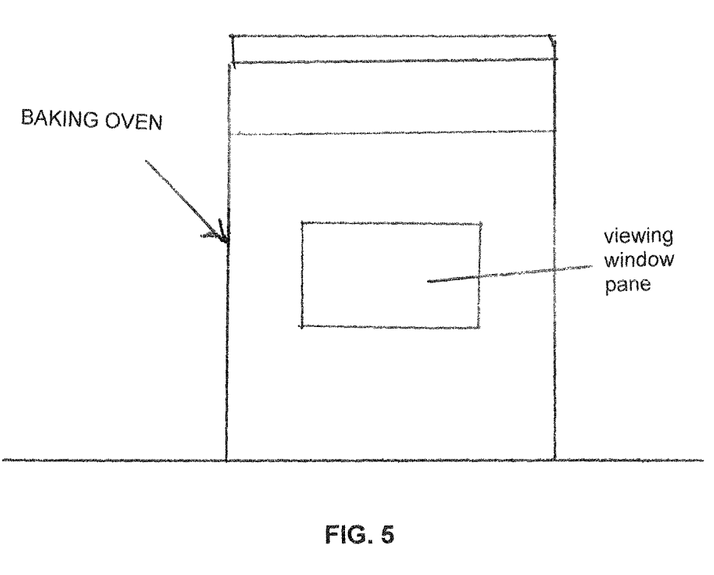
FIG. 5 is a front plan view of a baking oven having a viewing window pane of the present invention.

Viewing window panes with the aforesaid layer system were installed in a word-burning fireplace illustrated diagrammatically in FIG. 4. According to EN 13240 temperatures at five different positions (left, right, up, down, center) immediately in front of the fireplace viewing window panes, which were installed in order to suppress heat radiation, were measured by a thermo-element during combustion of a specific oak wood or beech wood structure having a uniform weight distribution. Alternatively, a calorimeter can be used for heating water, with which the complete heat output from the fireplace is measured. The layer system is provided on the side facing away from the fireplace. The temperature reached up to 180° C. 3 cm in front of the viewing window during combustion with a fireplace viewing window pane that was not provided with the layer system. Furthermore the window pane itself reached still higher temperatures of about 300° C. to 400° C.

In the case of a commercially obtained F: tin oxide coated glass ceramic the temperature 3 cm in front of the fireplace was reduced to a maximum of about 90° C. to 100° C.

When the above-described layer system was applied to one side of the viewing window pane the temperature 3 cm in front of the window pane was reduced to a maximum of 70° C.

With the layer system according to the invention coated on both sides of the glass window pane the temperature 3 cm in front of the viewing window pane was reduced to a maximum of about 40 to 50° C.

Figure 1:
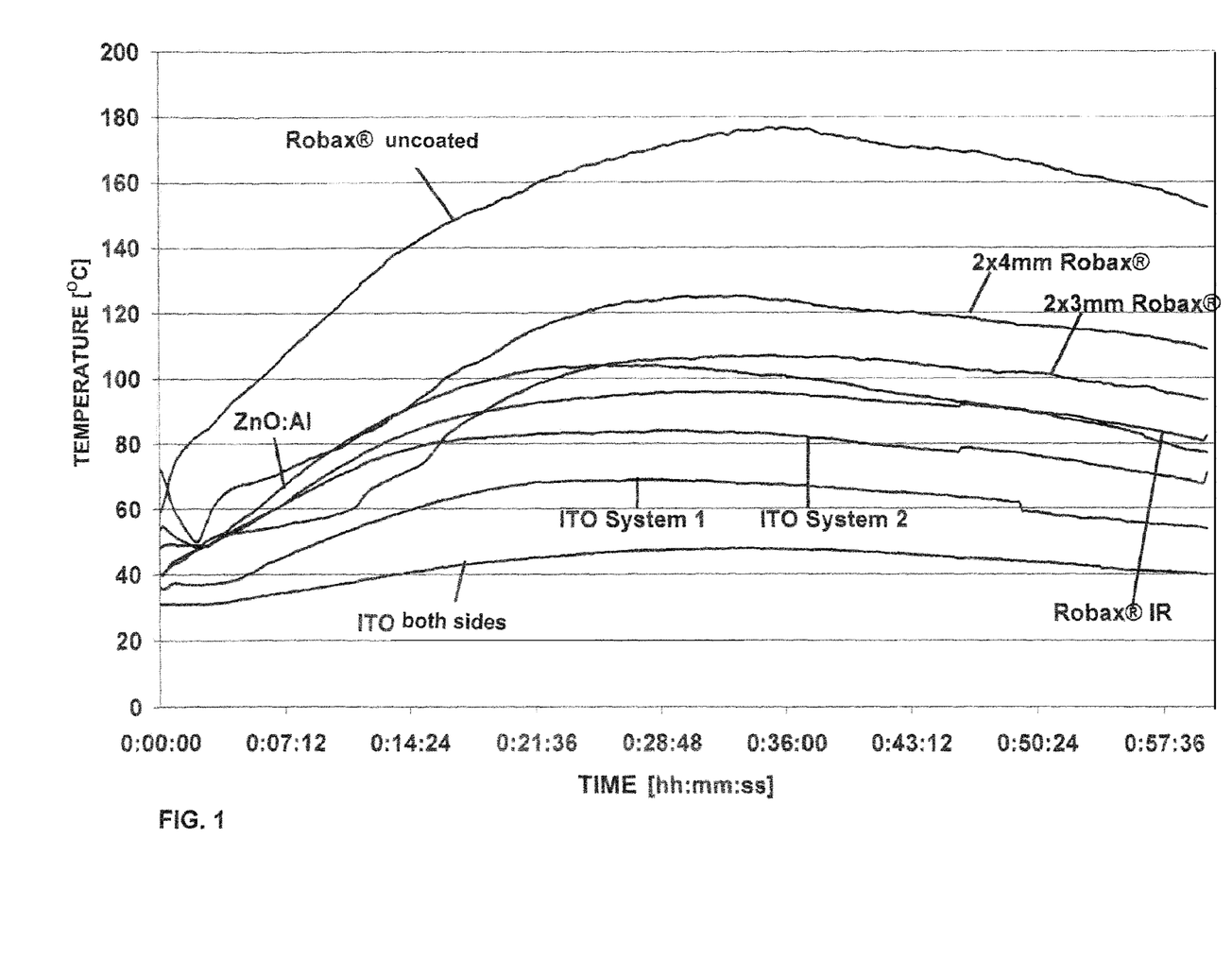
FIG. 1 is a graphical illustration showing the dependence of temperatures measured 3 cm in front of fireplace viewing window panes of the present invention and of the prior art as a function of time after starting combustion.

The behavior of the temperature as a function of time after starting the combustion process is illustrated for the above-described fireplace viewing window panes with the layer systems according to the invention and the prior art in the accompanying FIG. 1.

B) Temperature Behavior in the Exhaust Gas Pipe of the Fireplace

Figure 2:
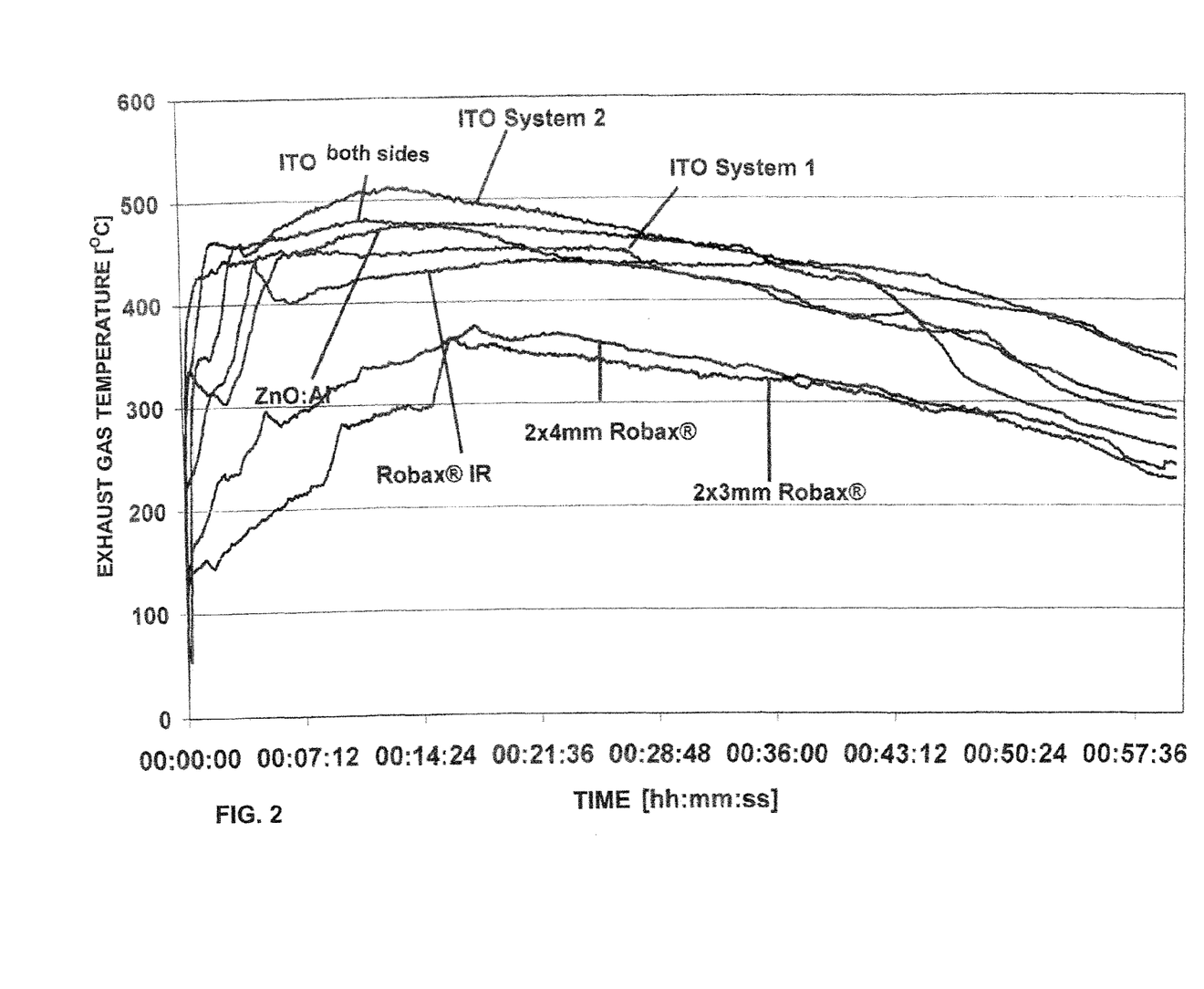
FIG. 2 is a graphical illustration showing the dependence of temperatures inside fireplaces provided with the fireplace viewing window panes of the present invention and of the prior art as a function of time after starting combustion.

The tendency for deposition of soot on the viewing window panes is reduced because of the use of the highly IR reflecting system according to the invention. The soot on the viewing window panes is reduced because the layer systems are equipped with the TCO layer. Of course the window pane is hotter because the soot or carbon deposits on the inner side of the window pane are burned. However fewer, largely pure soot particles are deposited on the window panes, because of the higher temperatures inside the fireplace in front of the window pane and since resin compounds burn first. The viewing window panes according to the invention may be easily cleaned with a dry cloth. In contrast window panes without the layer system for reflecting IR radiation according to the invention must be cleaned by an abrasive cloth soaked with a cleaning agent. The elevated temperature inside the fireplace is demonstrated by a rapidly increased temperature in the exhaust gas pipe. As can be understood from FIG. 2, the coatings according to the invention equally provide a rapid increase of the temperature at the start of the combustion. In contrast the coatings of the prior art provided only a delayed increase in the temperature.

While the invention has been illustrated and described as embodied in an arrangement for reflection of heat radiation, process of making same and uses of same, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. A heat reflecting arrangement that maintains a high reflectivity at thermal loads of 500° C. for more than 100 hours, said heat reflecting arrangement comprising
   a transparent glass or glass ceramic substrate;
   a heat reflecting layer (A) on at least one side of the substrate, said heat reflecting layer comprising at least 30% indium tin oxide (ITO) and having a thickness of 100 to 800 nm; and
   a barrier layer (B) that covers the heat reflecting layer (A), wherein said barrier layer (B) consists of at least one compound and said at least one compound is selected from the group consisting of $SiO_2$, $Si_3N_4$, $Al_2O_3$, $TiO_2$, $SiO_xN_y$, $ZrO_2$, $MoO_2$ and $Nb_2O_5$;
   wherein said barrier layer (B) has a thickness selected according a refractive index thereof, so that said heat reflecting layer (A) and said barrier layer (B) cooperate as reflector and interference system with a plasma edge from 1200 nm to 1600 nm, so that the arrangement is completely transparent in a visible range but reflects infrared radiation in an infrared range.

2. The heat reflecting arrangement according to claim 1, wherein said heat reflecting layer comprises at least 80 wt. % of said indium tin oxide and said thickness of said heat reflecting layer (A) is from 300 to 800 nm.

3. The heat reflecting arrangement according to claim 1, having a light transmittance of at least 85% in the visible range and a reflectivity in the infrared range of at least 0.9.

4. The heat reflecting arrangement according to claim 1, having a color change dE<4 in a LAB color system after a thermal load of 500° C. for at least 100 hours.

5. The heat reflecting arrangement according to claim 1, wherein said thickness of said barrier layer (B) is in a range of 50 nm to 400 nm.

6. The heat reflecting arrangement according to claim 1, wherein said thickness of said heat reflecting layer (A) is from 450 nm to 630 nm and said thickness of said barrier layer (B) is from 300 to 400 nm.

7. The heat reflecting arrangement according to claim 1, wherein the heat reflecting layer (A) has a charge density of from $1.0 \times 10^{21}$ to $1.7 \times 10^{21}$ electrons cm$^{-3}$.

8. A heat reflecting arrangement that maintains a high reflectivity at thermal loads of 500° C. for more than 100 hours, said heat reflecting arrangement comprising
   a transparent glass or glass ceramic substrate;
   a heat reflecting layer (A) on at least one side of the substrate, said heat reflecting layer comprising at least 30% indium tin oxide (ITO) and having a thickness of 100 to 800 nm; and
   a barrier layer (B) that covers the heat reflecting layer (A), wherein said barrier layer (B) consists of at least one compound and said at least one compound is selected from the group consisting of $SiO_2$, $Si_3N_4$, $Al_2O_3$, $TiO_2$, $SiO_xN_y$, $ZrO_2$, $MoO_2$ and $Nb_2O_5$;
   a separating layer (C) arranged between said glass or glass ceramic substrate and said heat reflecting layer, wherein said separating layer (C) consists of silicon dioxide, silicon nitride or aluminum oxide;
   wherein said barrier layer (B) has a thickness selected according a refractive index thereof, so that said heat reflecting layer (A) and said barrier layer (B) cooperate as reflector and interference system with a plasma edge from 1200 nm to 1600 nm, so that the arrangement is completely transparent in a visible range but reflects infrared radiation in an infrared range.

9. The heat reflecting arrangement as defined in claim 8, wherein said separating layer (C) has a thickness in a range of from 50 nm to 200 nm.

10. The heat reflecting arrangement according to claim 8, wherein said heat reflecting layer comprises at least 80 wt. % of said indium tin oxide and said thickness of said heat reflecting layer is from 300 to 800 nm.

11. The heat reflecting arrangement according to claim 8, having a light transmittance of at least 85% in a visible range and a reflectivity in an infrared range of at least 0.9.

12. The heat reflecting arrangement according to claim 8, having a color change dE<4 in a LAB color system after a thermal load of 500° C. for at least 100 hours.

13. The heat reflecting arrangement according to claim 8, wherein said thickness of said barrier layer (B) is in a range of 50 nm to 400 nm.

14. The heat reflecting arrangement according to claim 8, wherein said thickness of said heat reflecting layer (A) is from 450 nm to 630 nm and said thickness of said barrier layer (B) is from 300 to 400 nm.

15. The heat reflecting arrangement according to claim 8, wherein the heat reflecting layer (A) has a charge density of from $1.0 \times 10^{21}$ to $1.7 \times 10^{21}$ electrons cm$^{-3}$.

16. A process for making a heat reflecting arrangement, wherein said heat reflecting arrangement comprises a transparent glass or glass ceramic substrate; a heat reflecting layer (A) on at least one side of the substrate, said heat reflecting layer comprising at least 30% indium tin oxide (ITO) and having a thickness of 100 to 800 nm; and a barrier layer (B) that covers the heat reflecting layer (A), wherein said barrier layer (B) consists of at least one compound and said at least one compound is selected from the group consisting of $SiO_2$, $Si_3N_4$, $Al_2O_3$, $TiO_2$, $SiO_xN_y$, $ZrO_2$, $MoO_2$ and $Nb_2O_5$; wherein said barrier layer has a thickness selected according a refractive index thereof, so that said heat reflecting layer (A) and said barrier layer (B) cooperate as reflector and interference system with a plasma edge from 1200 nm to 1600 nm, so that the arrangement is completely transparent in a visible range but reflects infrared radiation in an infrared range, said process comprising the steps of:
   a) applying said heat reflecting layer (A) on said glass or glass ceramic substrate by means of a sputtering process; and
   b) after applying the heat reflecting layer (A), applying the barrier layer (B) over the heat reflecting layer.

17. The process as defined in claim 16, wherein the applying of the heat reflecting layer (A) takes place with a target power density of at least 4 to 5W/cm$^2$.

18. The process as defined in claim 16, further comprising applying a separating layer (C) to said substrate prior to applying the heat reflecting layer, and wherein at least one of the barrier layer (B) and the separating layer (C) is applied by means of at least one method selected from the group consisting of sputtering processes, sol-gel processes, vacuum vapor deposition processes, electron beam evaporation processes, ion plating processes and pyrolysis processes.

19. A fireplace comprising a heat reflecting arrangement maintains a high reflectivity at thermal loads of 500° C. for more than 100 hours, said heat reflecting arrangement comprising
   a transparent glass or glass ceramic substrate;
   a heat reflecting layer (A) on at least one side of the substrate, said heat reflecting layer comprising at least 30% indium tin oxide (ITO) and having a thickness of 100 to 800 nm; and
   a barrier layer (B) that covers the heat reflecting layer (A), wherein said barrier layer (B) consists of at least one compound and said at least one compound is selected from the group consisting of $SiO_2$, $Si_3N_4$, $Al_2O_3$, $TiO_2$, $SiO_xN_y$, $ZrO_2$, $MoO_2$ and $Nb_2O_5$;
   wherein said barrier layer has a thickness selected according a refractive index thereof, so that said heat reflecting layer (A) and said barrier layer (B) cooperate as reflector and interference system with a plasma edge from 1200 nm to 1300 nm, so that the arrangement is completely transparent in a visible range but reflects infrared radiation in an infrared range.

20. A baking oven comprising a heat reflecting arrangement that maintains a high reflectivity at thermal loads of 500° C. for more than 100 hours, said heat reflecting arrangement comprising
   a transparent glass or glass ceramic substrate;
   a heat reflecting layer (A) on at least one side of the substrate, said heat reflecting layer comprising at least 30% indium tin oxide (ITO) and having a thickness of 100 to 800 nm; and
   a barrier layer (B) that covers the heat reflecting layer (A), wherein said barrier layer (B) consists of at least one compound and said at least one compound is selected from the group consisting of $SiO_2$, $Si_3N_4$, $Al_2O_3$, $TiO_2$, $SiO_xN_y$, $ZrO_2$, $MoO_2$ and $Nb_2O_5$;

wherein said barrier layer has a thickness selected according a refractive index thereof, so that said heat reflecting layer (A) and said barrier layer (B) cooperate as reflector and interference system with a plasma edge from 1200 nm to 1300 nm, so that the arrangement is completely transparent in a visible range but reflects infrared radiation in an infrared range.

* * * * *